UNITED STATES PATENT OFFICE.

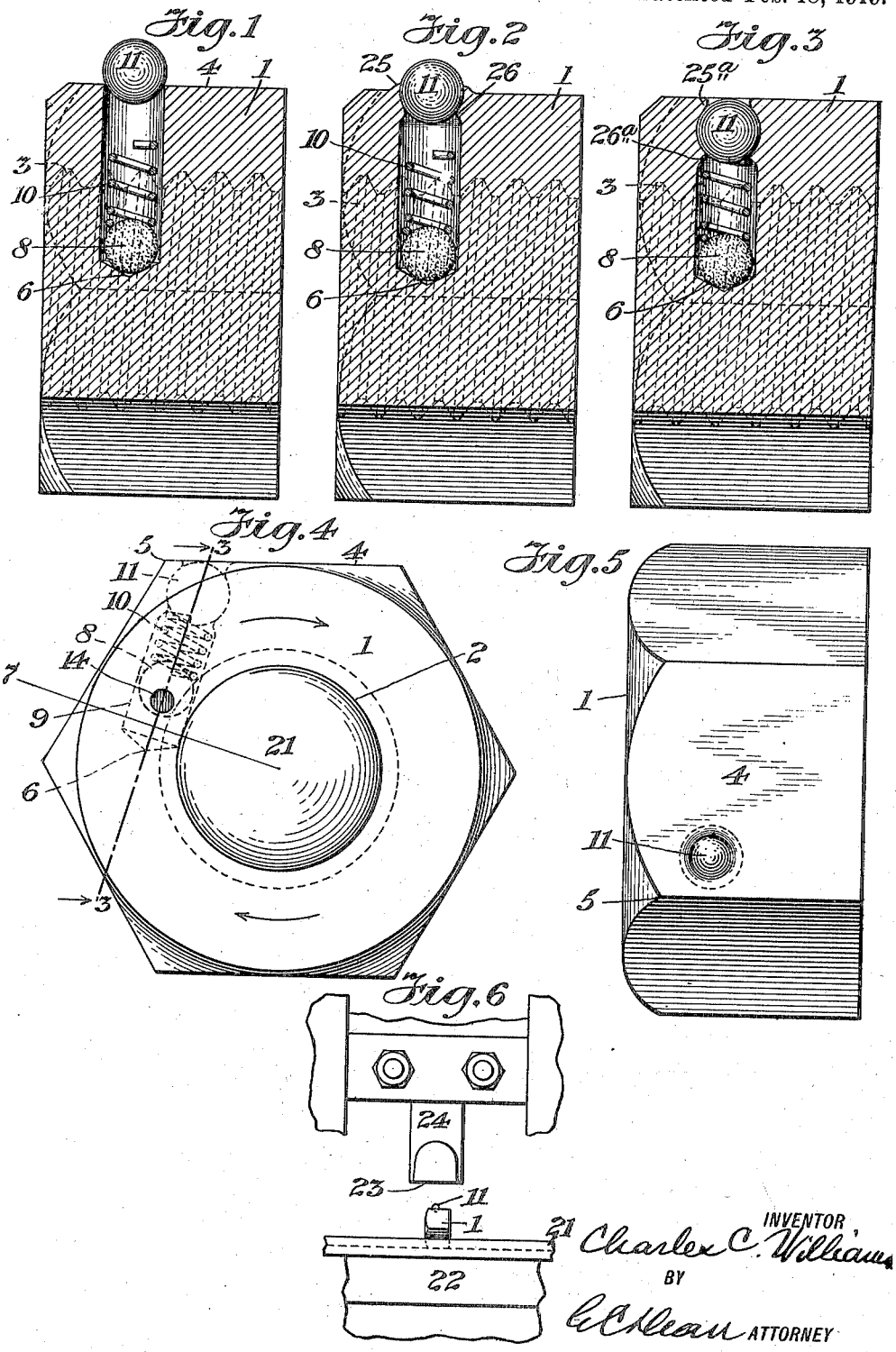

CHARLES C. WILLIAMS, OF DETROIT, MICHIGAN, ASSIGNOR TO EVERTITE NUT CORPORATION, OF DETROIT, MICHIGAN, A CORPORATION OF NEW YORK.

LOCK-NUT AND METHOD OF MAKING THE SAME.

1,294,995.     Specification of Letters Patent.     Patented Feb. 18, 1919.

Application filed April 29, 1918. Serial No. 231,508.

*To all whom it may concern:*

Be it known that I, CHARLES C. WILLIAMS, a citizen of the United States, and resident of Detroit, in the county of Wayne and State of Michigan, have invented certain new and useful Improvements Relating to Lock-Nuts and Methods of Making the Same, of which the following is a specification.

My present invention relates to lock nuts of the type in which a locking ball is arranged in a cylindrical passage drilled in from the side of the nut in such direction that it will break into the threaded interior more or less tangentially so that when the nut is screwed on to the bolt, the ball contacting with the bolt threads will be rolled along the drill passage in a direction away from the pinching point when the nut is screwed on, and toward the pinching point when the nut is screwed off.

The primary object of my present invention is to accomplish economical quantity production of commercially uniform reliable lock nuts using the ordinary commercial nuts and ordinary steel bearing balls as the raw material, so that lock nuts of the ball type may be made commercially available for ordinary uses. I accomplish this by a novel combination of features whereby all the desirable functions may be secured by merely drilling a hole in the nut, inserting a locking ball, a spring to push the ball forward, and a plug ball to close the hole. Both balls are preferably hard steel balls such as are commonly used for ball bearings. The locking ball preferably has a roughened surface as may be obtained by slight or rolling contact with a grinder without removing any substantial amount of metal and without impairing its spherical contour. The plug ball is preferably used with its surface in the polished condition in which such balls are usually marketed.

An important feature of my invention is the method of inserting and securing the plug ball. It consists in employing a ball slightly larger than the drill hole and forcing it into the mouth of the hole by application of powerful pressure. The ball being of very hard steel, very much harder than the metal of the nut, the first effect is to cause the metal of the nut to yield perpendicularly to its surface of engagement by the ball and this direction is nearly lateral at right angles to the hole. The metal thus displaced must flow somewhere, consequently part of it will flow upward to form a bulge or ridge around the mouth of the drill hole. As the forcing is continued, the ball soon reaches a depth where none of the metal will flow upward but is forced forward forming an annular ridge or shoulder below the ball. Still further pressure forces the ball to its final position flush with the surface of the nut, and simultaneously presses downward thereby causing to flow inward behind the ball the exterior bulge or ridge of metal initially formed by entry of the ball into the hole. The ball is thus tightly held between the annular collar forced ahead of it and the annular collar forced in behind it. The pressure for forcing the ball in may be continuously applied, where sufficient power is available, but in most cases, where the nuts are of iron or mild steel, it is more convenient to force the ball in and swage down the metal behind it by a series of blows from a power operated hammer.

The amount by which the size of the ball should exceed the size of the drill hole will depend upon the malleability of the metal of the nut and somewhat, also, upon the size of the hole. For a drill hole say .146″ in diameter, a polished steel bearing ball about one hundredth of an inch larger than the hole or say .156″ in diameter will give good results.

The lock ball is preferably made of a diameter not less than one and a quarter times the thickness of the threads of the nut, and the drill hole is located so that the straight line path of the ball when forcibly rolled to the point of tangency or nearest approach to the axis of the bolt, will intercept a cross-section of metal approximately equivalent to the major portion of one bolt thread, regardless of whether the ball happens to register with a single thread or with parts of two adjacent threads. For a ball as small as one and one quarter threads, the ball path is preferably cut into the bolt thread space approximately the full depth of a thread, and even for balls twice that diameter, the depth is preferably not less than two-thirds to three-quarters the depth of the thread.

The ball preferably projects into the screw thread space, nearly the depth of a screw thread while having substantially less than half the diameter of the ball projected for action on the metal of the bolt thread when at the point of deepest engagement.

The hole is preferably drilled less than its own diameter beyond the point of nearest approach to the axis of the nut so that the ball will contact with the bottom of the hole and be stopped from further travel at or just in advance of the point of maximum projection into the bolt hole, that is, the point of smallest distance between bolt and the opposite wall of the drill hole.

While the above features of my invention are particularly adapted for insuring reliable locking for commercial nuts and bolts with loose fitting threads, it is obvious that certain features of my invention will be useful though less necessary where the threads are more accurately cut or where the metal of the bolt is of much greater hardness.

I show my invention herein embodied in a nut of the hexagonal type. Commercial nuts of this shape are so proportioned that entering the drill at a tangent to the nut threads requires breaking into the corner of the nut, and drilling the tangent parallel with one side of the nut requires entering the drill through an adjacent side at a 60° angle. I avoid both of these difficulties by entering the drill near one corner but without mutilating the corner. With balls of the size above indicated, that is, not more than 2 nor less than 1¼ threads in diameter, it becomes possible to enter the drill at an easy angle, say 69° to 75° and yet have the wall of the drill hole break through the threads substantially tangent to the tips of the nut threads.

I find that where the angle of the drill hole to the surface which it enters does not much exceed that above specified, a polished plug ball may be driven in by blows perpendicular to the surface and yet will follow the drill hole accurately enough so that the collar raised and swaged in behind it at the mouth of the hole, and the collar pushed in ahead of the ball will approximate circular and symmetrical disposition near enough so as to make a satisfactory, practically smooth ball-retaining closure for the hole.

A desirable embodiment of the above described features of my invention is shown in the accompanying drawings in which—

Figures 1, 2 and 3 are sections on the line 3—3 Fig. 4, showing the plug ball in initial, intermediate and final positions characteristic of the above described method of insertion;

Fig. 4 is a top plan view of the nut showing in dotted lines the drill hole with balls and spring therein;

Fig. 5 is an edge view of the nut showing the plug ball in final position and the metal swaged in behind it as in Fig. 3; and Fig. 6 is an elevation showing coöperating parts of a press or hammer suitable for the practice of my method of inserting the plug balls, with a nut and plug ball in the initial position.

These drawings are approximately scale enlargements showing my invention applied to a ⅝″ hex nut of recognized standard proportions. The nut 1 has a threaded bolt opening 2 of a diameter substantially ½ the maximum diameter of the nut from corner to corner. The threads 3 are of standard pitch being approximately 11 to the inch for the ⅝″ nut. The threads are of standard shape having an outline which is approximately a series of equilateral triangles with the tips slightly cut off and the bottoms slightly filled in. Some of these details of the standard construction are unimportant and may be varied, but most of them as well as any variations thereof should be taken into account in the application of my invention thereto.

In this particular case, the drill was entered in the side 4 near the corner 5 at an angle of 72° from the face 4 and was of such size, in this case about 2½ times the depth of the screw threads, that the side of the drill hole breaks into the thread cavity of the nut tangent to the ridges of the nut thread. The drill hole is stopped at 6 at a point only slightly beyond the radial dotted line where the axis of the drill hole has its point of nearest approach to the bolt 21. The distance of the bottom of the drill hole beyond the tangent point, that is beyond radius 7, is preferably less than the radius of the ball 8 and must not be very much more than that radius, the object being to afford a positive stop to the inward rolling of the ball so that it may never be possible to have the latter rolled inward to a point where the straight wall 9 of the drill hole would recede from the bolt sufficient to release the ball.

The ball 8 is backed by spring 10 and a plug ball 11 affording a thrust for the spring and a closure for the drill hole.

In quantity production of the nuts, they may be passed in succession along a slideway, part of which is indicated at 21, Fig. 6. The lock ball and spring are successively dropped into the drill hole and the plug ball 11 placed on top of the nut as indicated in Fig. 1. The nut then resting on the flat anvil 22, with the drill hole and ball uppermost, it requires only sufficient pressing or hammering by the flat surface 23 of reciprocating member 24 to force the ball into the drill hole thereby raising the annular bulge 25 on the surface of the nut and pushing a coöperating annular collar 26 in advance of the ball. It will be understood that the metal which flows laterally and forms a bulge on the surface around the hole is not necessarily of the precise shape indicated in the drawings wherein these features are somewhat exaggerated for purposes of illustrating the principle. It will be also understood that the annular bulge is not necessarily equal or symmetrical all the way around the hole but where the hole is slanting, the bulge will be greater on the acute angle side of the hole as indicated in dotted lines, Fig. 5. Merely continuing the operation brings the ball to the position shown in Fig. 3 with the exterior bulge swaged down again level with the surface and the excess metal flowed into the mouth of the hole to form a collar 25ᵃ swaged in behind the ball flush with the surface of the nut.

When the finished nut is screwed on the bolt, the thread of the bolt serves to force the locking ball 11 back, compressing the spring between the locking ball and the plug ball thus maintaining the latter in firm contact with the thread of the bolt. In this condition, any attempt to unscrew the nut serves to roll the ball into pinching engagement with the thread. In all ordinary cases the locking ball 8 may be forced back out of locking position by inserting a pin through the hole 14, but where great violence has been used and the ball has been rolled into the bottom of the hole, the ball can only be brought back within range of operation of the pin by slightly screwing the nut downward, thus rolling it out of tangent position but in the extreme case where the unscrewing has been sufficiently violent to strip a considerable amount of metal, the nut cannot be removed except by destroying the bolt or nut or both.

It will be noted that in the drawings the ball is of a diameter equal to the width of nearly two screw threads and that when forced to the bottom of the drill hole, it has approximately ⅓ to ¼ of its diameter projecting into the bolt thread space and that this is sufficient to cause the ball to intercept the bolt threads nearly to the bottom thereof.

From my previous explanation of the invention, it will be understood that a ball only 1¼ threads in diameter should have approximately two-fifths of its diameter projecting into the bolt thread space when the ball is at the tangent point, where it contacts with the bottom of the drill hole.

It will also be evident that if a ball and drill be used, that is much more than three threads in diameter, the drill hole would have to enter the side 4 of the nut at an angle considerably less than 69° for otherwise the drill hole would strike the thread cavity considerably inside the tips of the nut threads with the result that the ball would engage the threads at a steep angle so that when the nut is unscrewed there would be danger of the ball slipping on the bolt threads instead of being rolled inward to lock them tighter. Moreover, there would not be room for the spring 10 and the plug ball 11.

The spring 10 is preferably so made that when in the position shown in Fig. 3, it is under no compression strain such as would make it follow the ball 8 beyond its position shown in said figure. Consequently, if the ball is rolled farther forward, the spring will not follow it, will not engage the threads of the bolt and hence will not be dragged into the narrow point where it would be likely to be laterally compressed, deformed or twisted out of shape.

From the detailed explanation of the principles of my invention first above given, and the further description of the desirable embodiment thereof shown in the drawings, any one skilled in the art will be able to apply the same to various sizes and models of nuts and to nuts having screw-threads of different pitch, depth or cross section.

I claim:

1. The method of making lock nuts from commercial nuts of relatively malleable metal, which method consists in drilling a transverse hole approximately tangent to the threads of the nut and terminating at or near the point of tangency, inserting a steel ball loosely fitting the drill hole, then a spring, then forcing into the mouth of the hole a polished steel ball of slightly larger diameter than the hole.

2. The method of forming a closure for the locking hole of lock nuts, which method consists of forcibly expanding the mouth of the hole in a radial direction to raise a bulge around the hole; enlarging the diameter of the hole for a short distance inward, inserting a closing plug having a diameter substantially equal to the enlarged portion of said passage, and upsetting the raised bulge of metal into the mouth of the hole thereby securing the plug and flattening the surface of the nut adjacent the hole.

3. The method of making lock nuts from commercial nuts of relatively malleable metal, which method consists in drilling a transverse hole breaking into the interior threads of the nut, forcing into the mouth of the hole a polished steel ball of slightly larger diameter than the hole to forcibly expand the mouth of the hole in a radial direction to raise a bulge around the hole and continuing the forcing movement to enlarge the diameter of the hole for a short distance inward, and finally upsetting the raised bulge of metal into the mouth of the hole behind the ball and flattening the surface of the nut adjacent the hole.

4. A screw nut of relatively malleable metal formed with a passage extending from the side of the nut and breaking into the interior screw threads thereof, a locking member in said passage and a closure for said passage comprising a ball of much harder metal than the nut and of slightly larger diameter than the passage, forced into the mouth thereof to raise a circular bulge around the mouth of the hole, and retained by the metal of said bulge pressed into the mouth of the hole behind the ball.

5. A screw nut of relatively malleable metal formed with a hole drilled from the side of the nut and breaking into the interior screw threads approximately tangent thereto, a locking ball in said hole and a closure for said hole comprising a polished steel ball of slightly larger diameter than the hole, forced into the mouth thereof to raise a circular bulge and retained by the metal of said bulge pressed into the mouth of the hole behind the ball.

Signed at Detroit, in the county of Wayne and State of Michigan, this 25th day of April, A. D. 1918.

CHARLES C. WILLIAMS.

Copies of this patent may be obtained for five cents each, by addressing the "Commissioner of Patents, Washington, D. C."